United States Patent [19]

Brulet

[11] Patent Number: 4,833,180
[45] Date of Patent: May 23, 1989

[54] PROCESS FOR POLYMERIZING VINYL CHLORIDE IN EMULSION OR IN MICROSUSPENSION

[75] Inventor: Daniel Brulet, Saint-Symphorien D'Ozon, France

[73] Assignee: Atochem, Puteaux, France

[21] Appl. No.: 65,947

[22] Filed: Jun. 24, 1987

[30] Foreign Application Priority Data

Jul. 11, 1986 [FR] France ................................ 86 10204

[51] Int. Cl.$^4$ ................................................ C08L 3/00
[52] U.S. Cl. ..................................... 523/322; 524/834; 526/68; 526/88; 526/344.2
[58] Field of Search ................. 523/322; 524/834; 526/68, 88, 344.2

[56] References Cited

U.S. PATENT DOCUMENTS

| | | | |
|---|---|---|---|
| 3,544,539 | 12/1970 | Koyanagi | 526/88 |
| 3,612,877 | 8/1972 | Czekay | 526/88 |
| 4,125,574 | 11/1978 | Kastner | 526/88 |

FOREIGN PATENT DOCUMENTS

| | | |
|---|---|---|
| 2309569 | of 0000 | France . |
| 1076373 | of 0000 | Netherlands . |
| 1093866 | of 0000 | United Kingdom . |

*Primary Examiner*—Joseph L. Schofer
*Assistant Examiner*—Peter D. Mulcahy
*Attorney, Agent, or Firm*—Sigalos, Levine & Montgomery

[57] ABSTRACT

A process for preparing vinyl chloride homopolymer or copolymer latexes, comprising carrying out the polymerization of a monomer composition in a reaction medium in emulsion or in microsuspension and continuously condensing a vapor fraction of said monomer composition and continuously refluxing said condensed vapor fraction into said reaction medium, degassing the resultant polymer, and carrying out the polymerization under agitation by means of a paddle agitator with a rotating shaft having at least one paddle and at least one deflector with the speed gredient between said at least one paddle and said at least one deflector being between 5 and 50 s$^{-1}$; the peripheral rotational speed of the agitator is maintained in the range of about 1.1 to 2.1 meters/second for about 50% to 100% of the duration of the polymerization period preceding the beginning of reflux ($P_1$) and the period which separates the end of reflux from the beginning of degassing ($P_3$), and at a speed in the range of about 0.4 to 1 meters/second for about 50% to 100% of the duration of the reflux period ($P_2$) and the degassing period ($P_4$).

7 Claims, No Drawings

PROCESS FOR POLYMERIZING VINYL CHLORIDE IN EMULSION OR IN MICROSUSPENSION

BACKGROUND OF THE INVENTIO

The object of this invention is a process for preparing homo-and copolymers of vinyl chloride, in teh form of latexes, by polymerizing the corresponding monomer(s) in emulsion or in microsuspension. Another object is the resulting latexes as well as the homo- and copolymers derived from the said latexes.

Polymerization in "emulsion" is understood to mean polymerization, in the presence of a water-soluble initiator or initiators, of at least one monomer added to an aqueous medium containing at least one emulsifier.

Polymerization in "microsuspension" is understood to mean polymerization, in the presence of an organosoluble initiator or initiators, of at least one monomer dispersed by energetic mechanical means in an aqueous medium containing at least one emulsifier. "Energetic mechanical means" is used to mean a wide variety of conventional dispersion devices, among which might be mentioned, for example, colloid mills, high-speed pumps, vibratory agitators, and ultrasonic devices.

Polymerization in emulsion or in microsuspension is usually performed by bringing the reaction medium, under autogenous pressure and with moderate agitation, to a temperature generally between 10° and 85° C. and preferably between 30° and 70° C. and maintaining it there. After the pressure has dropped, the reaction is halted, and the unconverted momoner(s) is (are) eliminated by degassing the resulting polymer.

Processes for preparing homo- and copolymers of vinyl chloride by polymerizing the corresponding monomer(s) in emulsion or in microsuspension are carried out in reactors which are generally fitted with a double fluid circulation jacket and equipped with a paddle agitator with a rotating shaft and at least one deflector. The peripheral rotation speed of the agitator and the radial distance between the edge of the paddles and the deflector are such that the speed gradient between the paddles and the deflector is between 5 and 50 $s^{-1}$. Such reactors are also equipped with a condensation cooling unit whose role is to extract from the reaction medium a portion of the heat deriving from the polymerization reaction, with the other portion being extracted by means of the circulation fluid in the double jacket. The said condensation cooling unit is generally of the reflux type, meaning that the liquefied phase produced by continuous condensation of the vapors emerging from the reaction medium continuously flows back into the said reaction medium.

According to the processes for preparing homo- and copolymers of vinyl chloride by polymerizing the corresponding monomer(s) in emulsion or in microsuspension utilized up to now, the peripheral rotation speed of the agitator is kept at a constant value of between 1 and 2 meters/second for the entire duration of the polymerization operation and the polymer degassing operation. These processes lead to the formation of a certain amount of crusts. If the processes occur at a peripheral agitator rotation speed of less than one meter/second, a smaller quantity of crusts is obtained, but the polymerization time becomes too long, and the conversion rate for the monomer(s) utilized becomes too low.

SUMMARY OF THE INVENTION

The process which is the object of this invention makes it possible, by suitably controlling the peripheral rotation speed of the agitator, all other things being equal, to reduce the quantity of crusts formed, without decreasing the conversion rate for the monomer(s) utilized and without leading to a longer polymerization time.

Briefly stated, the invention relates to a process for preparing vinyl chloride homopolymer or copolymer latexes, comprising carrying out the polymerization of a monomer composition in a reaction medium in emulsion or in microsuspension and continuously condensing a vapor fraction of said monomer composition and continuously refluxing said condensed vapor fraction into said reaction medium, degassing the resultant polymer, and carrying out the polymerization under agitation by means of a paddle agitator with a rotating shaft having at least one paddle and at least one deflector with the speed gradient between said at least one paddle and said at least one deflector being between 5 and 50 $s^{-1}$; the peripheral rotational speed of the agitator is maintained in the range of about 1.1 and 2.1 meters/second for about 50% to 100% of the duration of the polymerization period preceding the beginning of reflux ($P_1$) and the period which separates the end of reflux from the beginning of degassing ($P_3$), and at a speed in the range of about 0.4 to 1 meters/second for about 50% to 100% of the duration of the reflux period ($P_2$) and the degassing period ($P_4$). The polymerization of the monomer composition is carried out optionally in the presence of at least one seeding product.

DETAILED DESCRIPTION

According to the process of the invention, if $P_1$ is the polymerization period preceding the beginning of reflux, $P_2$ the reflux period, $P_3$ the period which separates the end of reflux from the beginning of degassing and $P_4$ and the degassing period, the peripheral rotational speed of the agitator is kept in the range between about 1.1 and 2.1 meters/second for 50–100% of the duration of each of periods $P_1$ and $P_3$ and in the range between about 0.4 and 1.0 meters/second for 50–100% of the duration of each of periods $P_2$ and $P_4$.

Preferably, the peripheral rotational speed of the agitator is kept in the range between 1.1 and 2.1 meters/second for 80–100% of the duration of each of periods $P_1$ and $P_3$ and in the range between 0.4 and 1.0 meters/second for 80–100% of the duration of each of periods $P_2$ and $P_4$.

More preferably, the peripheral rotational speed of the agitator is kept in the range between 1.1 and 2.1 meters/second for 90–100% of the duration of each of periods $P_1$ and $P_3$ and in the range between 0.4 and 1.0 meters/second for 90–100% of the duration of each of periods $P_2$ and $P_4$.

Indeed the applicant has found that if, all other things being equal, the peripheral rotational speed of the agitator is kept in two distinct predetermined ranges for a sufficiently large proportion, even as such as 100%, of the duration of each of periods $P_1$ and $P_3$, on the one hand, and of the duration of each of periods $P_2$ and $P_4$, on the other hand, it is possible to reduce the quantity of crusts formed, without reducing the conversion rate of the monomer(s) utilized and without leading to a higher polymerization time.

During any complementary portion of the duration of each of periods $P_1$ and $P_3$, the peripheral rotational speed of the agitator is preferably kept at least equal to 1.0 meter/second.

During any complementary portion of the duration of each of periods $P_2$ and $P_4$, the peripheral rotational speed of the agitator is preferably kept at most equal to 1.1 meters/second.

As used herein, "vinyl chloride polymers" are understood to mean homo- and copolymers, the latter containing at least 50% by weight of vinly chloride and at least one monomer copolymerizable with vinyl chloride. Copolymerizable monomers are those generally utilized in conventional vinyl chloride copolymerization techniques. Worthy of mention are vinyl esters of mono- and polycarboxylic acids such as vinyl acetate, propionate and benzoate; unsaturated mono- and polycarboxylic acids such as acrylic, methacrylic, maleic, fumaric, itaconic and amides, nitriles and aliphatic, cycloaliphatic and aromatic esters thereof; allyl, vinyl and vinylidene halides; alkylvinylethers; and olefins.

Water-soluble polymerization initiators which might be mentioned include all initiators capable of being used for preparing vinyl chloride polymers in emulsion, represented by hydrogen peroxide, alkali metal persulfates, ammonium persulfate, alkali metal perborates, ammonium perborate, tertiobutyl hydroperoxide and azobisisobutyronitrile. They are used in quantities generally ranging between 0.01% and 1% by weight referred to the monomer(s) utilized. These initiators are, if applicable, associated with a water-soluble reducing agent such as, for example, sodium sulfoxylate formaldehyde, sodium sulfite, sodium metabisulfite or sodium thiosulfate.

Organosoluble polymerization initiators which might be mentioned are all initiators capable of being utilized for preparing vinyl chloride polymers in microsuspension, represented by free radical generators such as organic peroxides, such as lauroyl peroxide, acetylcyclohexanesulfonyl peroxide, isobutyroyl peroxide, dichloracetyl peroxide and trichloracetyl peroxide; the peroxydicarbonates such as ethyl peroxydicarbonate, ethylhexyl peroxydicarbonate, isopropyl peroxydicarbonate and isobutyl peroxydicarbonate; tertiobutyl permethoxyacetate; tertiobutyl perethoxyacetate; and tertiobutyl perphenoxy-2-propionate. They are generally used in proportions of between 0.05% and 3% by weight referred to the monomer(s) utilized.

Emulsifiers that might be mentioned include, in particular, the anionic emulsifiers, preferably represented by the fatty acid soaps, alkaline alkylsulfates, alkaline alkylsulfonates, alkaline alkylarylsulfonates, alkaline alkylsulfosuccinates and alkaline alkylphosphates. Possibly, these are associated with nonionic emulsifiers, preferably represented by the polycondensates of ethylene and/or propylene oxide on various hydroxylated organic compounds such as the fatty alcohols and the nonylphenols. Emulsifiers are used in proportions generally between 0.3% and 4% and preferably between 0.5% and 2% by weight referred to the monomer(s) utilized.

The quantity of water to be utilized according to the process of the invention is such that the initial concentration of monomer(s) plus, if applicable, the seeding polymer or polymers, taking into account the water content of the seeding product, is generally between 20 and 80% and preferably between 45 and 75% by weight referred to the reaction mixture.

The polymerization operation is usually performed under autogenous pressure, by bringing the reaction medium to a temperature generally between 10° and 85° C. and preferably between 30° and 70° C. and maintaining it there. The polymerization temperature can be changed during the reaction.

Polymerization can be performed with or without seeding.

Polymerization in emulsion with seeding can be carried out, in particular, using the technique described in French Pat. No. 2,286,152. According to this technique, which employs a seeding product, the said seeding product is in the form of a vinyl chloride polymer latex previously prepared by polymerization in emulsion, and polymerization is performed in the presence of an emulsifier whose chemical nature is different from that of the emulsifier used to prepare the seeding product.

Polymerization in microsuspension with seeding can be performed, in particular using the technique described in French Pat. No. 1,485,547. According to this technique, which employs a seeding product, the said seeding product is in the form of a vinyl chloride polymer latex, previously prepared by polymerization in microsuspension, the particles of which contain all of the initiator required for polymerization.

Polymerization in microsuspension with seeding can be performed, in particular, using the technique described in French Pat. No. 2,309,569. According to this technique, which employs two seeding products, the two seeding products are in the form of a vinyl chloride latex with different particle sizes. The particles of at least one of the seeding products, previously prepared by polymerization in microsuspension, contain all of the initiator required for polymerization.

To increase the rate of polymerization in microsuspension in the presence of at least one seeding product containing all of the initiator required for polymerization, it is recommended that the initiator be activated with a water-soluble metallic complex and a complexing agent introduced progressively, as described in French Pat. No. 2,234,321. The metallic salt is utilized in a quantity such that the molar ratio between metallic salt and initiator is between 0.1 and 10, and the metal is represented by iron, copper, cobalt, nickel, zinc, tin, titanium, vanadium, manganese, chromium or silver. The complexing agent, represented by mono- and polycarboxylic acids, alkylphosphoric acids, lactones, ketones and carbazones, is used in a proportion which can reach molar stoichiometry with regard to the metallic salt.

The degassing operation is generally performed by subjecting the unconverted monomer(s) to reduced pressure, with the polymer being brought to or maintained at a temperature at least equal to 40° C. and lower than the temperature at which the polymer begins to break down, with these pressure and temperature conditions essentially being maintained until degassing stops. After degassing, atmospheric pressure is reestablished with an inert gas such as nitrogen or more generally with air.

Vinyl chloride polymers prepared using the process according to the invention can be separated from the polymerization medium by any known process such as filtration, coagulation/drying, flaking, centrifuge decantation or atomization.

The vinyl chloride polymers which are the object of the invention are applicable to the manufacture of sheets, films, hollow objects, cellular materials and articles shaped using the calendering, extrusion, blow-extrusion and injection-molding techniques, and to the preparation of applied coatings and articles shaped by any technique utilizing plastisols and organosols such as coating, rotation molding, dipping or spraying.

The invention will be further described in connection with the following examples which are set forth for purposes of illustration only.

In Examples 1 through 14 and 43 through 47, the process is carried out by polymerization in emulsion.

In Examples 15 through 28 and 48 through 52, the process is carried out by polymerization in emulsion in the presence of a seeding product, according to the technique described in French Pat. No. 2,286,152.

In Examples 29 through 42 and 53 through 57, the process is implemented by polymerization in microsuspension in the presence of two seeding products, according to the technique described in French Pat. No. 2,309,569.

Examples 1 through 5, 11 through 19, 25 through 33 and 39 through 42 are given for purposes of comparison.

Examples 6 through 10, 20 through 24, 34 through 38 and 43 through 57 are according to the invention.

Polymerization is conducted in a stainless-steel autoclave of 1,000 liters capacity, fitted with a double fluid circulation jacket and equipped with a paddle agitator with a rotating shaft, a deflector and a reflux condensation cooling system.

The agitator, in the form of a frame, has a peripheral diameter of 0.75 meters, and its flat paddles are 75 mm wide. The radial distance between the periphery of the paddles and the deflector is such that the speed gradient between the paddles and the deflector is 20 $s^{-1}$ for a peripheral agitator rotational speed of 1.6 meters/second.

Degassing is performed by first placing the autoclave in direct communication with a vinyl chloride storage gas bell, kept under an absolute pressure exceeding atmospheric pressure by 50 mbar, until the pressure in the autoclave and the gas bell are at equilibrium and then by means of a vacuum pump drawing from the autoclave and pumping into the gas bell, until the absolute pressure in the autoclave essentially corresponds to the vapor pressure of water at the temperature of the polymer. After degassing, the pressure prevailing in the autoclave is reestablished with air.

The quantity of crusts is determined by passing the latex produced through a sieve with a 500-μm mesh opening. It is represented by the quantity of polymer retained by the said sieve by weight per ton of polymer produced.

EXAMPLES 1 THROUGH 14 AND 43 THROUGH 47

380 kg of deionized water are introduced into the autoclave. After depressurization, the following are also added:
(i) 400 kg of vinyl chloride,
(ii) 240 g of sodium hydroxide,
(iii) 800 g of lauric acid, and
(iv) 95 g of ammonium persulfate.

The reaction mixture is heated to 52° C. with agitation, which corresponds to a relative pressure of 7.5 bars, and this temperature is maintained for the duration of the polymerization and degassing operations. After one hour of polymerization, an aqueous solution of sodium metabisulfite is continuously added at a rate of 4 g/hour, until the quantity of heat extracted from the reaction mixture per unit of time by the double jacket circulation fluid reaches its maximum value, and 10 kg of a 15% by weight aqueous solution of sodium dodecylbenzene sulfonate are continuously added over eight hours. When polymerization has ended; when the pressure drop is 3.5 bars or after a duration of 15 hours if this pressure drop has not been achieved after this period of time, the polymer is degassed. The degassing period is 3.5 hours. Another 10 kg of the aqueous solution of sodium dodecylbenzene sulfonate are added. A latex with an average particle diameter of 0.20 μm +±0.01 μm is obtained.

EXAMPLES 15 THROUGH 28 AND 48 THROUGH 52

310 kg of deionized water are introduced into the autoclave. After depressurization, the following are also added:
(i) 400 kg of vinyl chloride,
(ii) 130 g of sodium hydroxide,
(iii) 400 g of lauric acid,
(iv) 28 kg of a polyvinyl chloride seeding latex containing 40% dry matter by weight previously prepared in emulsion in the presence of sodium lauryl sulfate with an average particle diameter of 0.30 μm, and
(v) 100 g of ammonium persulfate.

The reaction mixture is heated to 52° C. with agitation, which corresponds to a relative pressure of 7.5 bars, and this temperature is maintained for the duration of the polymerization and degassing operations. After one hour of polymerization, an aqueous solution of sodium metabisulfite is continuously added at a rate of 4 g/hour, until the quantity of heat extracted from the reaction mixture per unit of time by the double jacket circulation fluid reaches its maximum value, and 15 kg of a 15% by weight aqueous solution of sodium dodecylbenzene sulfonate are continuously added over eight hours. When polymerization has ended; when the pressure drop is 3 bars or after a duration of 15 hours, if this pressure drop has not been achieved after this period of time, the polymer is degassed. The degassing period is 2.5 hours. A latex with two populations of particles of different sizes is obtained. The population of coarse particles and the population of fine particles have average diameters of 0.85 ±0.03 μm and 0.20 ±0.01 μm, respectively, and represent 75% and 25% by weight, respectively.

EXAMPLES 29 THROUGH 42 AND 53 THROUGH 57

255 kg of deionized water are introduced into the autoclave. After depressurization the following are also added:
(i) 400 kg of vinyl chloride,
(ii) 65 kg of a polyvinyl chloride seeding latex containing 31.5% by weight of dry matter, previously prepared in microsuspension, with an average particle diameter of 0.507 μm and containing 1.92% by weight referred to the polymer of lauroyl peroxide,
(iii) 23 kg of a polyvinyl chloride seeding latex containing 43.5% by weight of dry matter, previously prepared in emulsion with an average particle diameter of 0.130 μm and containing no lauroyl peroxide,
(iv) 2.8 kg of sodium dodecylbenzene sulfonate, and
(v) 15 g of copper sulfate of the formula $CuSO_4 \cdot 5H_2O$.

The reaction mixture is heated with agitation to 52° C., which corresponds to a relative pressure of 7.5 bars, and this temperature is maintained for the duration of the polymerization and degassing operations. As soon as the temperature reaches 52° C., continuous addition of an aqueous solution of ascorbic acid at 0.57 g/liter is begun at a rate of 2 liters/hour and is continued until the polymerization operation ends. When polymerization has ended; when the pressure drop is 3 bars or after a duration of 15 hours, if this pressure drop has not been achieved after this period of time, the polymer is degassed. The degassing period is three hours. A latex with two populations of particles of different sizes is obtained. The population of coarse particles and the population of fine particles have average diameters of 1.10 ±0.05 μm and 0.20 ±0.01 μm, respectively, and represent 82% and 18% by weight, respectively.

In all the examples, reflux of the liquefied monomer coming from the condensation cooling system begins two hours after the reaction mixture is brought up to temperature and ends when the pressure drop reaches 1.5 bars.

In Examples 1 through 42, the peripheral rotation speed of the agitator is kept at a value $V_1$ during periods $P_1$ and $P_3$ and at a value $V_2$ during periods $P_2$ and $P_4$.

In the comparison Examples 1 through 5, 15 through 19 and 29 through 33, the values of $V_1$ and $V_2$ are the same; i.e., the peripheral rotation speed of the agitator is constant for the entire duration of the polymerization and degassing operations.

In the comparison Examples 11 through 14, 25 through 28 and 39 through 42, one of the values $V_1$ and $V_2$ is not in accordance with the invention.

In Examples 43 through 57, the peripheral rotation speed of the agitator is kept at a value $V_1$ for two periods which begin at the same time as periods $P_1$ and $P_3$, respectively, and whose duration represents 85% of the duration of periods $P_1$ and $P_3$, respectively, and at a value $V_2$ for two periods which being at the same time as periods $P_2$ and $P_4$, respectively, and whose duration represents 85% of the duration of periods $P_2$ and $P_4$, respectively.

During the complementary portion of the duration of each of periods $P_1$ and $P_3$, the peripheral speed of the agitator is kept at 1.0 meters/second.

During the complementary portion of the duration of each of periods $P_2$ and $P_4$, the peripheral rotation speed of the agitator is kept at 1.1 meters/second.

Tables I and II below indicate for each of Examples 1 through 42 and each of Examples 43 through 57, respectively:

(a) the value $V_1$ for the peripheral rotation speed of the agitator during all (Table I) or part (Table II) of periods $P_1$ and $P_3$, (b) the value $V_2$ for the peripheral rotation speed of the agitator during all (Table I) or part (Table II) of periods $P_2$ and $P_4$, (c) the polymerization time to the beginning of degassing, (d) the conversion rate of the vinyl chloride utilized, and (e) the quantity of crusts If degassing begins after a period of 15 hours has elapsed, polymerization is indicated (Table I) as ">15". In such cases, the indicated values for the conversion rate of the vinyl chloride utilized and quantity of crusts (Table I) are those determined after 15 hours of polymerization.

TABLE I

| | Comparison Examples | | | | | Examples according to the invention | | | | | Comparison Examples | | | |
|---|---|---|---|---|---|---|---|---|---|---|---|---|---|---|
| Value $V_1$ (meters/second) | 0.7 | 0.9 | 1.1 | 1.6 | 1.9 | 1.2 | 1.6 | 2.0 | 1.6 | 1.6 | 1.6 | 1.6 | 0.9 | 2.2 |
| Value $V_2$ (meters/second) | 0.7 | 0.9 | 1.1 | 1.6 | 1.9 | 0.7 | 0.7 | 0.7 | 0.5 | 0.9 | 0.3 | 1.2 | 0.7 | 0.7 |
| EXAMPLES | 1 | 2 | 3 | 4 | 5 | 6 | 7 | 8 | 9 | 10 | 11 | 12 | 13 | 14 |
| Polymerization time (hours) | >15 | >15 | 12.6 | 12.6 | 12.9 | 12.6 | 12.6 | 12.5 | 12.6 | 12.0 | >15 | 12.6 | >15 | 12.6 |
| Conversion rate (%) | 62.5 | 68.3 | 90.3 | 90.3 | 91.2 | 90.1 | 90.3 | 91.2 | 90.1 | 90.8 | 63.4 | 91.0 | 72.2 | 91.6 |
| Quantity of crusts (kg) | 9.3 | 9.1 | 7.3 | 12.2 | 16.9 | 3.4 | 3.9 | 4.3 | 3.3 | 4.1 | 4.9 | 10.1 | 4.6 | 15.6 |
| EXAMPLES | 15 | 16 | 17 | 18 | 19 | 20 | 21 | 22 | 23 | 24 | 25 | 26 | 27 | 28 |
| Polymerization time (hours) | >15 | >15 | 11.9 | 11.8 | 12.1 | 11.3 | 11.2 | 11.2 | 11.8 | 11.1 | >15 | 11.9 | >15 | 11.9 |
| Conversion rate (%) | 53.2 | 60.6 | 90.1 | 90.8 | 91.1 | 90.1 | 90.3 | 90.8 | 90.0 | 90.4 | 48.8 | 91.3 | 55.3 | 91.8 |
| Quantity of crusts (kg) | 11.7 | 11.7 | 9.2 | 14.3 | 19.5 | 4.0 | 4.3 | 4.9 | 4.8 | 8.6 | 13.5 | 8.9 | 14.4 | |
| EXAMPLES | 29 | 30 | 31 | 32 | 33 | 34 | 35 | 36 | 37 | 38 | 39 | 40 | 41 | 42 |
| Polymerization time (hours) | >15 | >15 | 13.8 | 13.5 | 13.2 | 13.2 | 13.0 | 12.5 | 13.1 | 12.8 | >15 | 13.6 | >15 | 13.2 |
| Conversion rate (%) | 50.2 | 61.2 | 91.2 | 92.1 | 92.2 | 91.0 | 92.1 | 92.2 | 91.5 | 92.0 | 58.3 | 92.5 | 70.6 | 92.9 |
| Quantity of crusts (kg) | 10.0 | 9.8 | 7.8 | 13.4 | 19.0 | 3.1 | 4.0 | 4.4 | 3.3 | 4.7 | 5.1 | 12.1 | 7.1 | 13.5 |

TABLE II

| | Examples according to the invention | | | | |
|---|---|---|---|---|---|
| Value $V_1$ (meters/second) | 1.2 | 1.6 | 2.0 | 1.6 | 1.6 |
| Value $V_2$ (meters/second) | 0.7 | 0.7 | 0.7 | 0.5 | 0.9 |
| EXAMPLES | 43 | 44 | 45 | 46 | 47 |
| Polymerization time (hours) | 12.6 | 12.5 | 12.6 | 12.6 | 12.3 |
| Conversion rate (%) | 90.2 | 90.3 | 91.1 | 90.0 | 90.2 |
| Quantity of crusts (kg) | 3.7 | 4.4 | 4.5 | 3.5 | 4.3 |
| EXAMPLES | 48 | 49 | 50 | 51 | 52 |
| Polymerization time (hours) | 11.5 | 11.3 | 11.4 | 11.8 | 11.3 |
| Conversion rate (%) | 90.1 | 90.2 | 90.6 | 90.0 | 90.3 |
| Quantity of crusts (kg) | 4.2 | 4.2 | 4.9 | 4.3 | 4.8 |
| EXAMPLES | 53 | 54 | 55 | 56 | 57 |
| Polymerization time (hours) | 13.2 | 13.1 | 12.7 | 13.1 | 12.9 |
| Conversion rate (%) | 91.0 | 91.8 | 91.9 | 91.5 | 92.0 |
| Quantity of crusts (kg) | 3.2 | 3.8 | 4.2 | 3.5 | 4.7 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for preparing vinyl chloride homopolymer or copolymer latexes, comprising carrying out the polymerization of a monomer composition in a reaction medium in emulsion or in microsuspension and during the polymerization continuously condensing a vapor fraction of said monomer composition and continuously refluxing said condensed vapor fraction into said reaction medium, degassing the resultant polymer, and carrying out the polymerization under agitation by means of a paddle agitator with a roating shaft having at least one paddle and at least one deflector with the speed gradient between said at least one paddle and said at least one deflector being between 5 and 50 s$^{-1}$; the peripheral rotational speed of the agitator is maintained in the range of about 1.1 and 2.1 meters/second for about 50% to 100% of the duration of the polymerization period preceding the beginning of reflux ($P_1$) and the period which separates the end of reflux from the beginning of degassing ($P_3$), and at a speed in the range of about 0.4 to 1 meters/second for about 50% to 100% of the duration of the reflux period ($P_2$) and the degassing period ($P_4$).

2. The process of claim 1, wherein the peripheral rotational speed of the agitator is kept in the range between 1.1 and 2.1 meters/second for 80-100% of the duration of each of periods $P_1$ and $P_3$ in the range between 0.4 and 1.0 meters/second for 80-100% of the duration of each of periods $P_2$ and $P_4$.

3. The process of claim 1, wherein the rotational speed of the agitator is kept in the range between 1.1 and 2.1 meters per second for 90-100% of the duration of each of periods $P_1$ and $P_3$ and in the range between 0.4 and 1.0 meter/second for 90-100% of the duration of each of periods $P_2$ and $P_4$.

4. The process of claim 1, 2, or 3, wherein the peripheral rotational speed of the agitator is kept at least equal to 1.0 meter/second during any complementary portion of the duration of each of periods $P_1$ and $P_3$.

5. The process of claim 1, 2, or 3, wherein the peripheral rotational speed of the agiator is kept at most equal to 1.1 meters/second during any complementary portion of the duration of each of periods $P_2$ and $P_4$.

6. The vinyl chloride homopolymer or copolymer latex product of the process of claim 1, 2, or 3.

7. The vinyl chloride homopolymer or copolymer latex product of the process of claim 1, 2, or 3, wherein the peripheral rotational speed is kept at least equal to 1.0 meter/second during any complementary portion of the duration of each of periods $P_1$ and $P_3$ and at most equal to 1.1 meters/second during any complementary portion of the duration of each of periods $P_2$ and $P_4$.

* * * * *